UNITED STATES PATENT OFFICE.

JAMES RIDDICK PARTINGTON AND LESLIE HENRY PARKER, OF LONDON, ENGLAND.

FERTILIZER.

1,348,578.     Specification of Letters Patent.     Patented Aug. 3, 1920.

No Drawing.     Application filed December 12, 1918. Serial No. 266,466.

*To all whom it may concern:*

Be it known that we, JAMES RIDDICK PARTINGTON and LESLIE HENRY PARKER, both subjects of the King of Great Britain, residing at Chemical Research Laboratory University College, Gower street, London, W. C. 1, England, have invented certain new and useful Improvements in and Relating to Fertilizers, of which the following is a specification.

This invention relates to fertilizers.

It is generally known that the most important constituents of artificial fetrilizers are nitrogen in the form of ammonium salts or nitrates and phosphates. In some commonly used fertilizers the salts present are combinations of an active group with an inactive group or element. Thus for instance, in the case of ammonium sulfate, while the basic radical is of value as a fertilizer, the acid radical is not.

As will be apparent, a salt of which both the basic and acid radicals are of value as fertilizers would be a more desirable substance to employ.

While ammonium nitrate comprises both acid and basic radicals which possess fertilizing value, the properties of ammonium nitrate render it unsuitable for use as a fertilizer as, being deliquescent as usually prepared, it is difficult to spread uniformly on the soil.

The salt in itself is not a complete plant food since it does not contain phosphoric acid, while when it is attempted to supply this deficiency by mixing together ammonium nitrate and superphosphate the difficulty due to deliquescence is increased. If, on the other hand, basic slag is employed as the phosphatic constituent, the free lime present in the slag causes the decomposition of the nitrate and loss of ammonia.

The object of the present invention is to provide an improved fertilizer containing nitrogen and phosphorous in a form available for plant life.

According to the invention ammonium nitrate, preferably ammonium nitrate in the form of a dry powder produced, for instance, by bringing together oxids of nitrogen, oxygen, water and ammonia in such conditions that the proportions of oxygen present in the reaction mixture is in excess of that required on the basis of theory to convert the whole of the oxids of nitrogen into nitrogen dioxid, the proportion of ammonia being insufficient to react with the whole of the oxids of nitrogen and the proportion of water being not in excess of, and preferably equal to, that which is sufficient to convert the whole of the ammonia added into ammonium nitrate by interaction with the oxids of nitrogen and oxygen, or by passing ammonium nitrate in the form of a mist or fume through or into contact with a dehydrating agent, is mixed with bone meal.

Further, according to the invention other bodies possessing value as fertilizers and which do not lead to the decomposition of either of the main constituents of the fertilizer in such a way as to render the product unsuitable for use as a plant food may be incorporated into the mixture of ammonium nitrate and bone meal.

In carrying the invention into effect, one part by weight of ammonium nitrate produced, for instance, as described in the specification referred to, may be mixed with, for example, three parts by weight of bone meal, and the whole finely ground. In this manner a fertilizer is obtained which remains quite dry, does not cake when exposed to the atmosphere, and presents no difficulties in storage and distribution.

In the production of fertilizers according to the invention, materials such, for instance, as potash salts, such as the sulfate or chlorid, may form constituents of the fertilizer.

Having now described our invention, what we claim as new and desire to secure by Letters Patent is:—

1. A fertilizer comprising ammonium nitrate mixed with bone meal to form a non-hygroscopic product.

2. A fertilizer comprising ammonium nitrate in the form of a dry powder and bone meal.

3. A fertilizer comprising ammonium nitrate in the form of a dry non-deliquescent powder and bone meal.

4. A powdered ammonium nitrate containing fertilizer comprising bone meal and being capable of being spread uniformly on the soil.

5. A dry stable fertilizer containing ammonium nitrate and bone meal in a finely divided form.

In testimony whereof we have signed our names to this specification.

JAMES RIDDICK PARTINGTON.
LESLIE HENRY PARKER.